US012789754B2

(12) United States Patent
Lee et al.

(10) Patent No.: US 12,789,754 B2
(45) Date of Patent: Nov. 10, 2026

(54) VEHICLE SENSOR CLEANING APPARATUS AND CONTROL METHOD THEREOF

(71) Applicants: DY AUTO CORPORATION, Chungcheongnam-do (KR); DY-ESSYS CORP., Incheon (KR)

(72) Inventors: Jong Wook Lee, Chungcheongnam-do (KR); Sin Won Kang, Chungcheongnam-do (KR); Min Wook Park, Incheon (KR); Sun Ju Kim, Incheon (KR); Hyeong Jun Kim, Incheon (KR)

(73) Assignees: DY AUTO CORPORATION (KR); DY-ESSYS CORP (KR)

( * ) Notice: Subject to any disclaimer, the term of this patent is extended or adjusted under 35 U.S.C. 154(b) by 50 days.

(21) Appl. No.: 18/583,647

(22) Filed: Feb. 21, 2024

(65) Prior Publication Data

US 2024/0286583 A1 Aug. 29, 2024

(30) Foreign Application Priority Data

Feb. 23, 2023 (KR) ........................ 10-2023-0024584

(51) Int. Cl.
*B60S 1/56* (2006.01)
*B60S 1/48* (2006.01)
*B60S 1/54* (2006.01)

(52) U.S. Cl.
CPC ................. *B60S 1/56* (2013.01); *B60S 1/481* (2013.01); *B60S 1/487* (2013.01); *B60S 1/54* (2013.01)

(58) Field of Classification Search
CPC .. B60S 1/56; B60S 1/481; B60S 1/487; B60S 1/54
See application file for complete search history.

(56) References Cited

U.S. PATENT DOCUMENTS

| | | | | |
|---|---|---|---|---|
| 5,419,005 | A | 5/1995 | Mori | |
| 2004/0211398 | A1* | 10/2004 | Knight | F02B 33/34 123/559.1 |
| 2014/0166109 | A1* | 6/2014 | Takai | F04B 23/00 137/625.11 |
| 2018/0183379 | A1* | 6/2018 | Yokoyama | H02P 27/08 |
| 2019/0210570 | A1* | 7/2019 | Schmidt | B60S 1/56 |
| 2020/0001832 | A1* | 1/2020 | Deane | B08B 3/02 |
| 2022/0097658 | A1* | 3/2022 | Nagai | B60S 1/46 |
| 2022/0362788 | A1 | 11/2022 | Leidefeldt | |

(Continued)

FOREIGN PATENT DOCUMENTS

| | | | |
|---|---|---|---|
| JP | 2005-186855 | A | 6/1998 |
| JP | 2006-520300 | A | 8/2004 |
| JP | 2005-295605 | A | 1/2011 |

(Continued)

*Primary Examiner* — Erin F Bergner
(74) *Attorney, Agent, or Firm* — Klarquist Sparkman, LLP

(57) ABSTRACT

A vehicle sensor cleaning apparatus and a control method of the vehicle sensor cleaning apparatus are disclosed. The vehicle sensor cleaning apparatus includes a washer pump motor configured to spray washer fluid on at least one sensor located in a vehicle, and a liquid controller configured to control the washer pump motor. The liquid controller is further configured to stop the washer pump motor from operating for a predefined idle time when a number of operations of the washer pump motor reaches a predefined maximum number of operations.

10 Claims, 11 Drawing Sheets

(56) References Cited

U.S. PATENT DOCUMENTS

| | | | | |
|---|---|---|---|---|
| 2023/0166694 | A1* | 6/2023 | Kim | G01S 17/931 15/313 |
| 2023/0182689 | A1* | 6/2023 | Yang | G02B 27/0006 239/284.1 |

FOREIGN PATENT DOCUMENTS

| | | | | |
|---|---|---|---|---|
| JP | 2018-107934 | A | 7/2018 | |
| JP | 2018-116159 | A | 7/2018 | |
| KR | 1998-0078682 | A | 11/1996 | |
| KR | 1998-0019848 | A | 6/1998 | |
| KR | 10-2004-0026491 | A | 3/2004 | |
| KR | 10-2020-0050153 | A | 5/2020 | |
| WO | WO-2020162085 | A1 * | 8/2020 | B60S 1/56 |

* cited by examiner

VEHICLE SENSOR CLEANING APPARATUS AND CONTROL METHOD THEREOF

CROSS-REFERENCE TO RELATED APPLICATION

This application is based on and claims priority under 35 U.S.C. § 119 to Korean Patent Application No. 10-2023-0024584, filed on Feb. 23, 2023, in the Korean Intellectual Property Office, the disclosure of which is incorporated by reference herein in its entirety.

BACKGROUND

1. Field

The disclosure relates to a vehicle sensor cleaning apparatus for cleaning a sensor installed on a vehicle and a control method thereof.

2. Description of the Related Art

Recent vehicles include various types of sensors (cameras, radars, LiDars, etc.) A vehicle sensor may not normally work when foreign materials are on a surface thereof. When the sensors necessary for autonomous driving or various driving assistance do not work normally, the safety of vehicle operation may be affected. Although a system that emits washer fluid to remove foreign materials on a vehicle windshield has been used, it is difficult to employ a washer fluid emitting system to clean small sensors located in various parts of a vehicle.

SUMMARY

The disclosure provides a vehicle sensor cleaning apparatus for removing foreign materials on a surface of a sensor included in a vehicle and a control method of the vehicle sensor clearing apparatus.

Additional aspects will be set forth in part in the description which follows and, in part, will be apparent from the description, or may be learned by practice of the presented embodiments of the disclosure.

According to an embodiment, a vehicle sensor cleaning apparatus includes a washer pump motor configured to spray a washer fluid on at least one sensor located in a vehicle, and a liquid controller configured to control the washer pump motor, wherein the liquid controller is further configured to stop the washer pump motor from operating for a predefined idle time when a number of operations of the washer pump motor reaches a predefined maximum number of operations.

According to an embodiment, a control method of a vehicle sensor cleaning apparatus includes controlling a washer pump motor configured to spray a washer fluid on at least one sensor located in a vehicle, and controlling at least one compressor motor configured to compress air to spray air on the at least one sensor located in the vehicle, wherein the controlling of the washer pump motor includes stopping the washer pump motor from operating for a predefined idle time when a number of operations of the washer pump motor reaches a predefined maximum number of operations.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
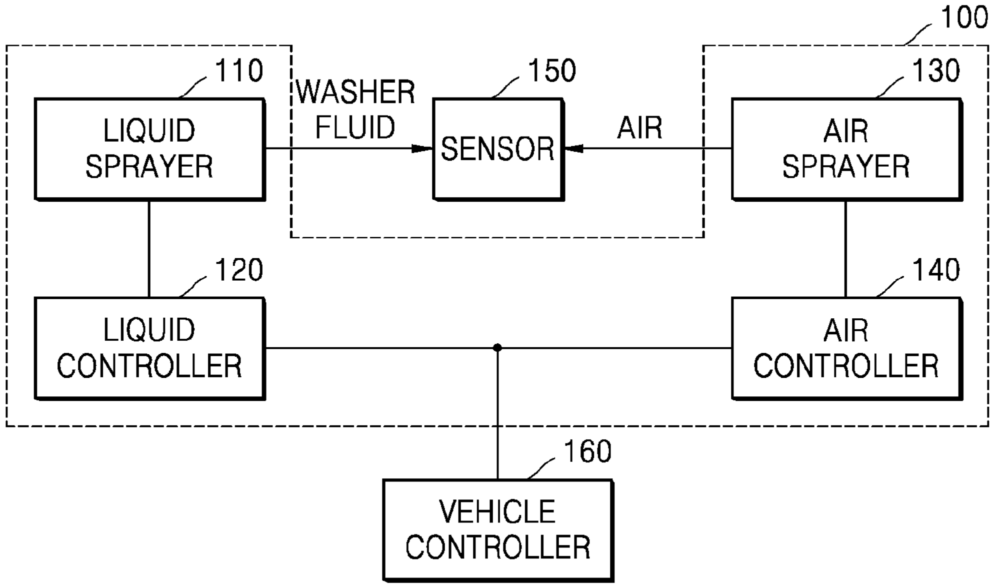
FIG. 1 is a view illustrating an example of an overall structure of a vehicle sensor cleaning apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a vehicle sensor cleaning apparatus and a control method of the vehicle sensor cleaning apparatus, according to an embodiment, will be described in detail with reference to the accompanying drawings.

FIG. 1 is a view illustrating an example of an overall structure of a vehicle sensor cleaning apparatus according to an embodiment.

Referring to FIG. 1, a vehicle sensor cleaning apparatus 100 may include a liquid sprayer 110, a liquid controller 120, an air sprayer 130, and an air controller 140. The vehicle sensor cleaning apparatus 100 may be connected to a vehicle controller 160. In some embodiments, the vehicle sensor cleaning apparatus 100 may further include a gateway (not shown) that transmits a cleaning request of the vehicle controller 160 to each of the liquid controller 120 and the air controller 140. Each of the liquid controller 120 and the air controller 140 may be implemented as a micro controller unit (MCU) or the like.

The liquid sprayer 110 may spray a washer fluid on a sensor 150. The washer fluid may include various components according to an embodiment. For example, the washer fluid may include various components such as general water or components identical to those used in a vehicle glass.

Figure 3:
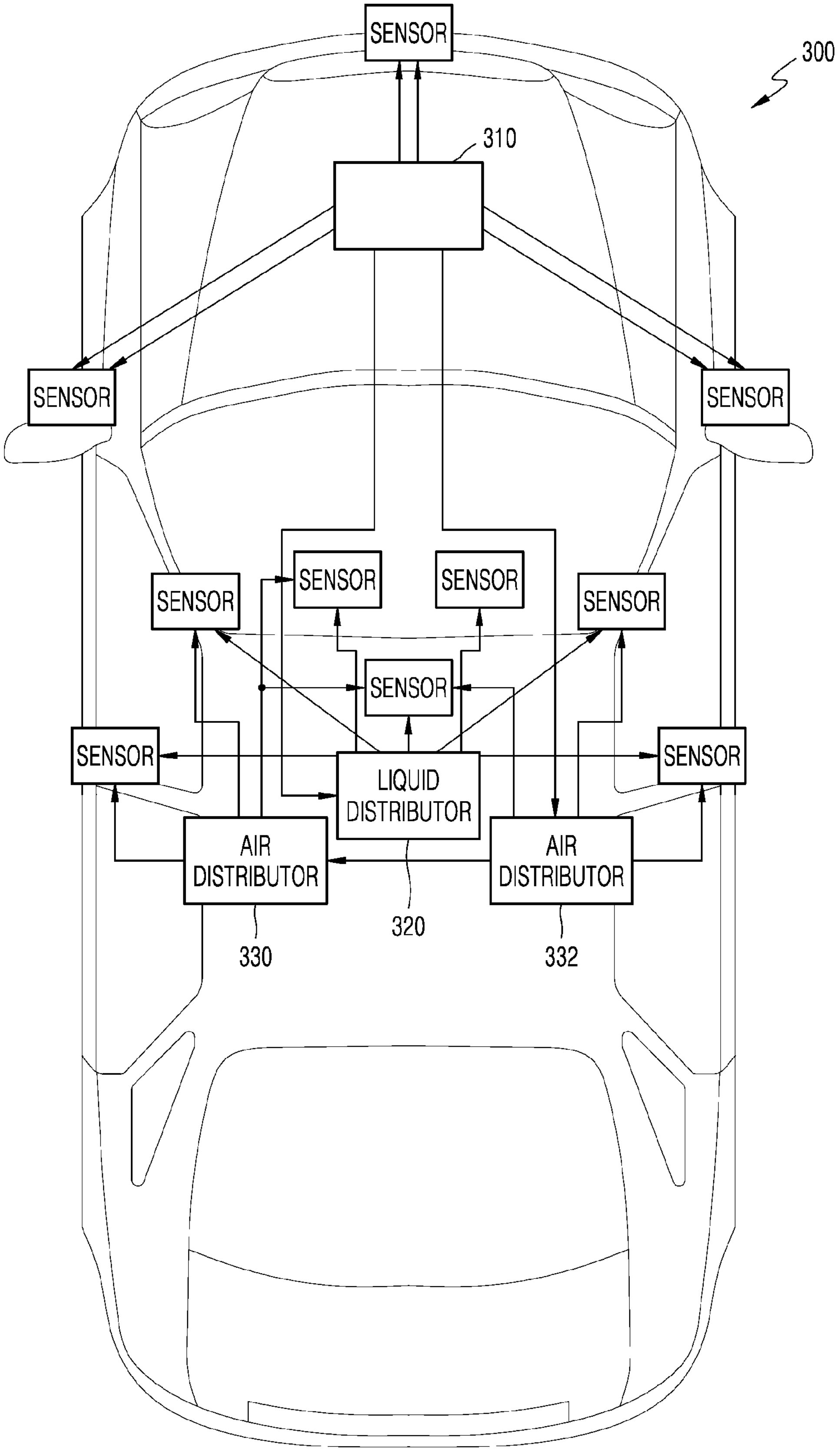
FIG. 3 is a view illustrating an example of a vehicle including a vehicle sensor cleaning apparatus, according to an embodiment.
Figure 6:
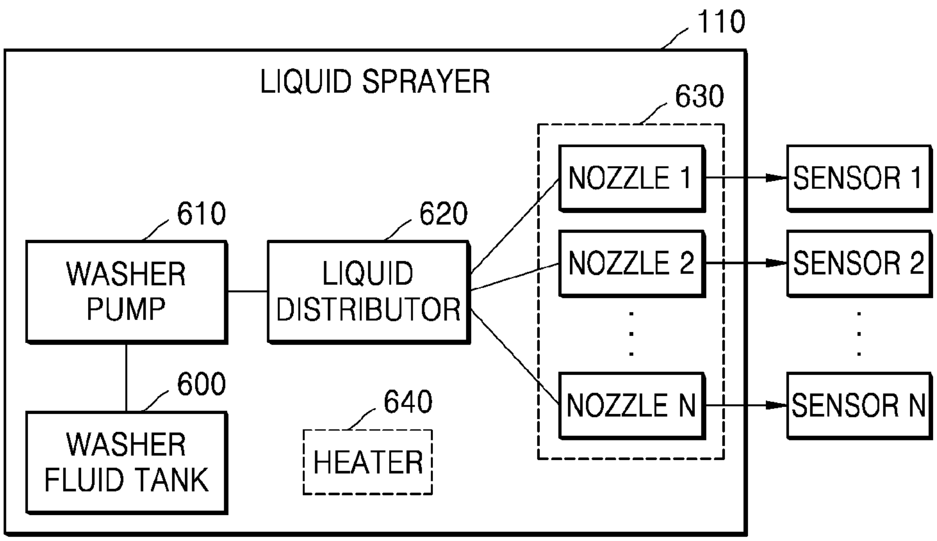
FIG. 6 is a view illustrating an example of a detailed structure of a liquid sprayer, according to an embodiment.

The present embodiment shows only one sensor 150 for convenience of explanation, but a vehicle may include a plurality of sensors as shown in FIG. 3. The liquid sprayer 110 may spray washer fluids simultaneously or sequentially on a plurality of sensors, or spray washer fluids only on sensors that require cleaning, and, in this regard, an example of a configuration of the liquid sprayer 110 is shown in FIG. 6.

The liquid controller 120 may control the washer fluid spraying of the liquid sprayer 110. For example, when the liquid controller 120 receives a cleaning request from the vehicle controller 160, the liquid controller 120 may control the liquid sprayer 110 to spray the washer fluid. When there is a cleaning request signal for a plurality of sensors, washer fluid spraying may be sequentially or simultaneously performed.

Figure 5:
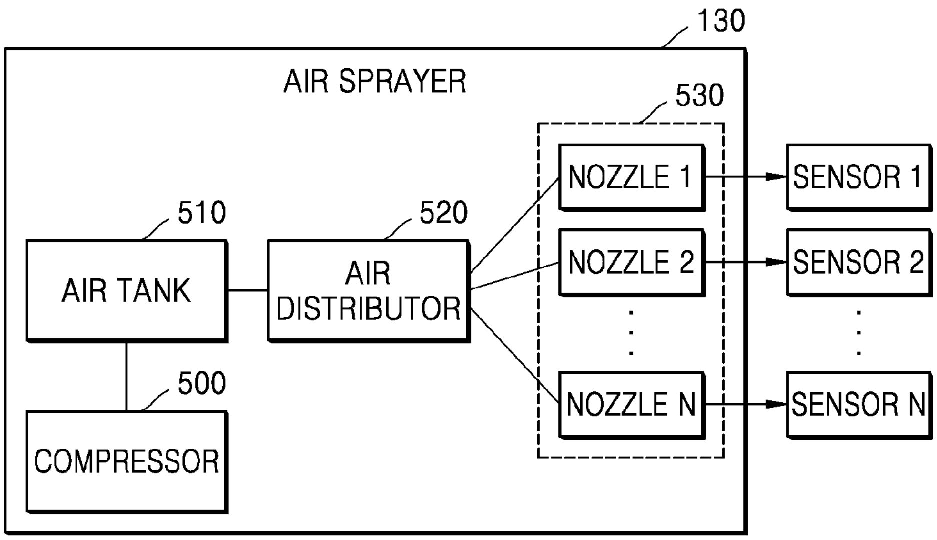
FIG. 5 is a view illustrating an example of a detailed structure of an air sprayer, according to an embodiment.

The air sprayer 130 may spray air on the sensor 150. Because there are a plurality of sensors in the vehicle, the air sprayer 130 may simultaneously or sequentially spray air on the plurality of sensors, or spray air only on sensors that require cleaning. An example of a configuration of the air sprayer 130 is shown in FIG. 5. Air sprayed on the sensor may be general air or compressed air. FIG. 5 is an example of spraying compressed air.

The air controller 140 may control the spraying of air of the air sprayer 130. For example, when the air controller 140 receives a cleaning request from the vehicle controller 160, the air controller 140 may control the air sprayer 130 to spray air.

The vehicle controller 160 may output a cleaning request command when the sensor 150 requires cleaning. For example, the vehicle controller 160 may identify a sensor that requires cleaning through various conventional methods. Because a method for the vehicle controller 160 to identify a sensor that requires cleaning is beyond the scope of the disclosure, descriptions thereof are omitted. The present embodiment is described assuming that the liquid controller 120 and the air controller 140 receive a cleaning request signal including sensor identification information from the vehicle controller 160.

The vehicle controller 160 may only output a cleaning request command and may not limit the cleaning method. In this case, according to the cleaning request, the method of cleaning each sensor may be variously implemented. As another example, the vehicle controller 160 may output a cleaning request command specifying the cleaning method. The present embodiment provides a method of performing cleaning through washer fluid spraying and air spraying when a cleaning request is received from the vehicle controller 160. For the sensor cleaning to be performed efficiently, the washer fluid spraying and the air spraying may be alternately performed. A method of controlling the spraying operations of the liquid sprayer 110 and the air sprayer 130 so as not to overlap each other will be described with reference to FIG. 7.

Figure 2:
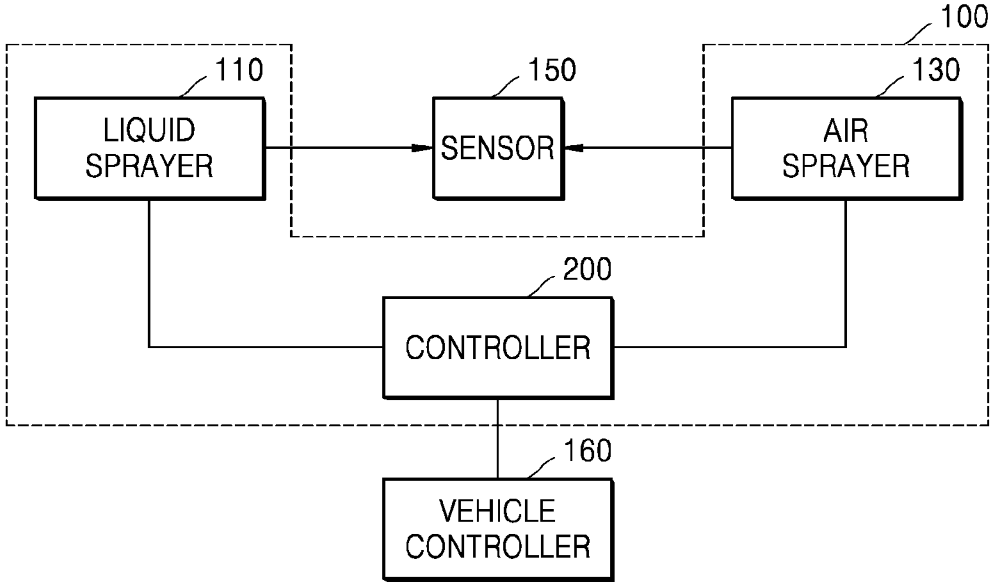
FIG. 2 is a view illustrating another example of a vehicle sensor cleaning apparatus according to an embodiment.

FIG. 2 is a view illustrating another example of the vehicle sensor cleaning apparatus according to an embodiment.

Referring to FIG. 2, a vehicle sensor cleaning apparatus 100 may include a liquid sprayer 110, an air sprayer 130, and a controller 200. The vehicle sensor cleaning apparatus 100 may be connected to a vehicle controller 160. Because the liquid sprayer 110, the air sprayer 130, the vehicle controller 160, and a sensor 150 of the present embodiment are the same as the configuration of FIG. 1, the descriptions corresponding thereto are omitted.

The present embodiment may include the controller 200 in which the liquid controller 120 and the air controller 140 of FIG. 1 are integrated. When the controller 200 receives a cleaning request from the vehicle controller 160, the liquid sprayer 110 and the air sprayer 130 may be controlled to simultaneously or sequentially spray the washer fluid and air. Each configuration and function of the liquid controller 120 and the air controller 140 may be integrally implemented in the controller 200.

However, hereinafter, for convenience of explanation, descriptions will be made based on the configuration of FIG. 1. Therefore, the functions and configurations of the liquid controller 120 and the air controller 140, which will be described later, may be implemented with the controller 200 of FIG. 2.

FIG. 3 is a view illustrating an example of a vehicle in which the vehicle sensor cleaning apparatus is implemented, according to an embodiment.

Referring to FIG. 3, a plurality of sensors are provided in a vehicle 300. On one side 310 of the vehicle, some components of the liquid sprayer 110 and the air sprayer 130 (e.g., an air tank (air reservoir) and washer fluid tank (washer fluid reservoir) of FIGS. 5 and 6) may be provided. The present embodiment shows a case in which the air tank and the washer fluid tank are arranged in one location, but this is only an example, and the air tank and the washer fluid tank may be arranged in different locations of the vehicle. In some embodiments, a plurality of air tanks and a plurality of washer fluid tanks may be provided.

A nozzle that sprays air and/or washer fluid may be arranged in each sensor. Air is sprayed on the sensor through the air nozzle of FIG. 5, and the washer fluid is sprayed on the sensor through the liquid nozzle of FIG. 6.

One or more air distributors 330 and 332 may be provided for supplying compressed air of the air tank to the air nozzle arranged in each sensor. The air controller 140 may spray air on a desired sensor by controlling the air distributor 330 and 332.

One or more liquid distributors 320 may be provided for supplying the washer fluid of the washer fluid tank to the liquid nozzle arranged in each sensor. The liquid controller 120 may spray the washer fluid on a desired sensor by controlling the liquid distributor 320.

Figure 4:
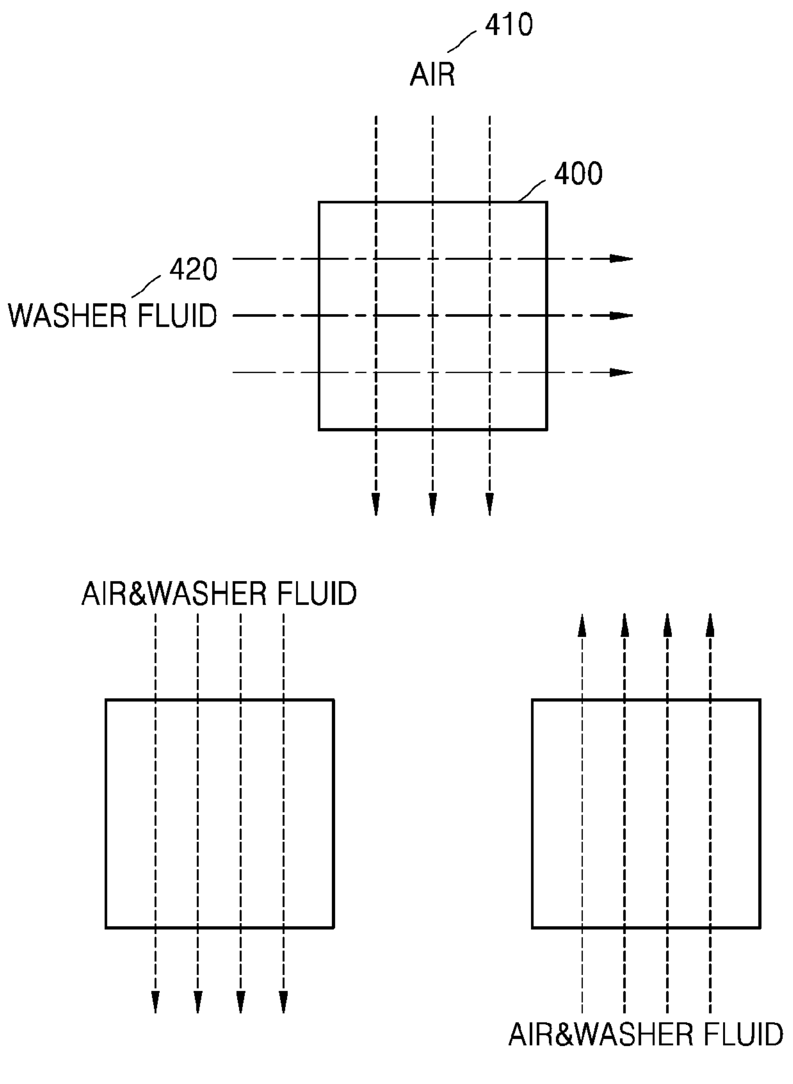
FIG. 4 is a view illustrating an example of a cleaning direction of a sensor, according to an embodiment.

FIG. 4 is a view illustrating an example of a cleaning direction of a sensor, according to an embodiment.

Referring to FIG. 4, a direction 420 of a washer fluid sprayed on the surface of a sensor 400 and a direction 410 of air on the surface of the sensor 400 may be different from each other. In addition, the washer fluid and the air may be simultaneously or sequentially sprayed, or only one of the washer fluid and the air may be sprayed. For example, the liquid sprayer 110 may spray the washer fluid from the left to the right on the sensor 400, and the air sprayer 130 may spray the air from the top to the bottom of the sensor 400. The washer fluid and air sprayed in different directions may effectively remove foreign materials on the surface of the sensor 400. For example, air may be sprayed from the top to the bottom to remove the washer fluid or rainwater left on the surface of the sensor 400.

In another embodiment, the direction 420 of the washer fluid sprayed on the surface of the sensor 400 and the direction 410 of the air may be the same. For example, the washer fluid and the air may be sprayed from the top to the bottom (or from the bottom to the top) of the sensor 400. Through the simultaneous spraying of the washer fluid and air, the pressure on the surface of the sensor may be increased to effectively remove foreign materials on the surface. In addition, the direction and order of spraying the washer fluid and the air may vary depending on embodiments.

FIG. 5 is a view illustrating an example of a detailed structure of an air sprayer, according to an embodiment.

Referring to FIG. 5, an air sprayer 130 may include a compressor 500, an air tank 510, an air distributor 520, and a plurality of nozzles 530.

The compressor 500 may compress and stores air in the air tank 510. In an embodiment, the compressor 500 may include a plurality of compressor compressor motors. In this case, the compressor 500 may alternately use a plurality of compressor motors to prevent a load from being added to one compressor motor. A compressor 500 including one compressor motor may be implemented. In another embodiment, a compression intensity of air stored in the air tank 510 may be adjusted through the compressor 500.

The air tank 510 may store the compressed air. In an embodiment, air may be sprayed on the sensor by using a propeller, etc. without the compressor 500 and the air tank 510. However, since the intensity of air generated through the propeller, etc. is weak, it is difficult to cleanly remove foreign materials or water on the surface of the sensor. Therefore, the present embodiment may increase the intensity (e.g., the speed or spraying force) of air sprayed on the sensor by using compressed air stored in the air tank 510.

The air distributor 520 may distribute compressed air output from the air tank 510 to the plurality of nozzles 530. The nozzles 530 may be respectively arranged in the sensors and spray air on the sensors. In an example, the air distributor 520 may include a plurality of channels that output compressed air, and the channels are respectively connected to the nozzles 530 through air hoses. When the number of sensors is greater than the number of channels of the air distributor 520, a plurality of air distributors 520 may be provided. For example, the plurality of air distributors 520 may each be connected in parallel to the air tank 510, or the plurality of air distributors 520 may be connected to each other in a hierarchical structure such as a tree structure.

The air distributor 520 may turn on/off each channel under the control of the air controller 140. For example, when the air distributor 520 receives an on command of a first channel from the air controller 140, the air distributor 520 may output compressed air of the air tank 510 through the first channel, and a first nozzle connected to the first channel through an air hose may spray air on a first sensor. The on/off of the channel may be controlled through a solenoid valve, etc.

To control the performance of the air distributor 520 of turning each channel on/off, the air controller 140 may identify and store, in advance, which channel of the air distributor 520 each sensor is connected to. For example, if a relationship between first sensor identification information and the first channel is defined, when cleaning of the first sensor is required, the air controller 140 may transmit the on command of the first channel of the air distributor 520 to the air distributor 520.

FIG. 6 is a view illustrating an example of a detailed structure of a liquid sprayer, according to an embodiment.

Referring to FIG. 6, a liquid sprayer 110 may include a washer fluid tank 600, a washer pump 610, a liquid distributor 620, and at least one nozzle 630.

The washer fluid tank 600 may store the washer fluid. The washer pump 610 may output the washer fluid stored in the washer fluid tank 600 to the liquid distributor 620. The liquid distributor 620 may output the washer fluid received through the washer pump 610 through the nozzle 630. The washer pump 610 may output the washer fluid through washer pump motor driving. The nozzle 630 may spray the washer fluid on the sensor. Each nozzle 630 may be connected to the liquid distributor 620 through a liquid hose. In an embodiment, the nozzle 630 may protrude when the washer fluid is sprayed on the sensor and then retract back in when spraying is completed.

In another embodiment, there may be a plurality of washer pumps 610. For example, when there are 20 nozzles, 1st to 10th nozzles may be connected to a first washer pump (or a first washer pump motor), 11th to 14th nozzles may be connected to a second washer pump (or a second washer pump motor), and 15th to 20th nozzles may be connected to a third washer pump (or a third washer pump motor). The liquid controller 120 may control a plurality of washer pumps (or a plurality of washer pump motors) in parallel.

The liquid distributor 620 may select the nozzle 630 to output the washer fluid according to the control of the liquid controller 120. In an example, the liquid distributor 620 may include a plurality of channels that output the washer fluid, and the channels are respectively connected to the nozzles 630 through liquid hoses. When the number of sensors becomes greater than the number of channels of the liquid distributor 620, a plurality of liquid distributors 620 may be provided. For example, the plurality of liquid distributors 620 may each be connected in parallel to the washer pump 610, or the plurality of liquid distributors 620 may be connected to each other in a hierarchical structure such as a tree structure.

The liquid distributor 620 may spray the washer fluid on the desired sensor by turning on/off the plurality of channels. When the liquid distributor 620 receives the on command of the first channel from the liquid controller 120, the washer fluid is output through the first channel, and the first nozzle connected to the first channel may spray the washer fluid on the first sensor. The liquid controller 120 may identify and store in advance which channel of the liquid distributor 620 each sensor is connected to, like the air controller 140 described above. For example, if a relationship between the first sensor identification information and the first channel is defined in advance, when cleaning of the first sensor is required, the liquid controller 120 may transmit the on command of the first channel of the liquid distributor 620 to the liquid distributor 620. In an embodiment, each channel connected to each nozzle may be turned on/off through a solenoid valve.

In some embodiments, the liquid sprayer 110 may further include a heater 640. The heater 640 may supply heat to the liquid hose connecting each nozzle 630 to the liquid distributor 620, the washer pump 610, the washer fluid tank 600, or the liquid distributor 620. For example, when the external temperature is low, such as in winter, etc., the washer fluid in the liquid hose or liquid distributor 620 may freeze, and thus, the heater 640 may prevent the washer fluid from being frozen. In an embodiment, the liquid controller 120 may operate the heater 640 when the liquid controller 120 receives a command to operate the heater 640 or when an external temperature identified through a temperature sensor is less than a preset temperature.

Figure 7:
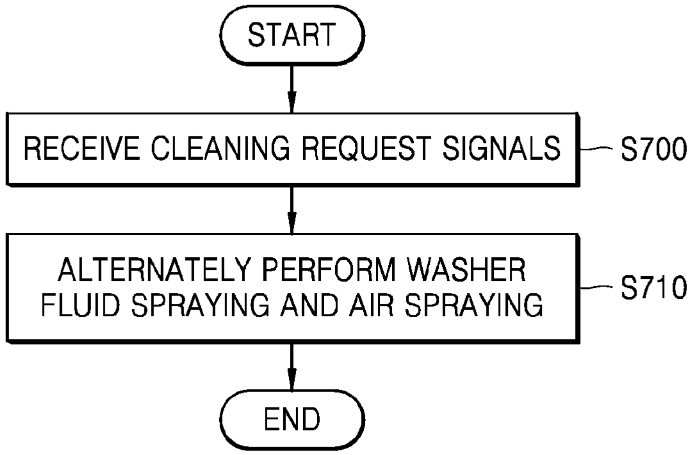
FIG. 7 is a view illustrating an example of an alternating control method of a vehicle sensor cleaning apparatus, according to an embodiment.

FIG. 7 is a view illustrating an example of an alternating control method of a vehicle sensor cleaning apparatus, according to an embodiment.

Referring to FIG. 7, the liquid controller 120 and/or the air controller 140 may receive a cleaning request signal from the vehicle controller 160 (S700). The cleaning request signal may include identification information on at least one sensor to be cleaned. The liquid controller 120 and/or the air controller 140 may be connected to the vehicle controller 160 via Controller Area Network (CAN) or CAN with Flexible Data Rat (CAN FD).

The washer fluid spraying control start point of the liquid controller 120 and the air spraying control start point of the air controller 140 may be different from each other to allow washer fluid and air to be alternately sprayed (S710). For example, the liquid controller 120 and the air controller 140 may control washer fluid spraying and air spraying to be alternately performed for the same sensor.

An alternating control method for the same sensor may be implemented in various ways.

In an embodiment, when the liquid controller 120 receives a cleaning request signal, the liquid controller 120 may convert the mode to a liquid spray mode, in which washer fluid is sprayed on a sensor corresponding to the cleaning request signal, and inform the air controller 140 of the on state of the liquid spray mode. The liquid controller 120 may be connected to the air controller 140, and the air controller 140 may not perform air spraying when receiving the on state of the liquid spray mode. If air is being sprayed when the air controller 140 receives the on status of the liquid spray mode, the air controller 140 may immediately stop spraying air. When the air controller 140 confirms that the liquid spray mode is in an off state through the liquid controller 120, the air controller 140 may perform air spraying according to a cleaning request signal. The air controller 140 may request and receive the status of the liquid spray mode from the liquid controller 120 at regular intervals, or the liquid controller 120 may send status information to the air controller 140 whenever the status of the liquid spray mode changes. In addition, the liquid controller 120 and the air controller 140 may share the state of the liquid spray mode through various methods.

In another embodiment, when the washer cleaning request and the air cleaning request simultaneously occur, the liquid controller 120 may immediately output a control signal for washer fluid spraying according to the washer cleaning request. When the air controller 140 receives the air cleaning request, the air controller 140 may output a control signal for air spraying after a predefined period of time has elapsed. That is, there is a certain time interval between the start point of a washer fluid spraying operation and the start point of an air spraying operation. For example, the liquid controller 120 may control the liquid sprayer 110 to spray washer fluid for a time t1 after receiving the washer cleaning request, and the air controller 140 may control the air sprayer 130 to spray air after the time t1 has elapsed after receiving the air cleaning request.

In another embodiment, washer fluid spraying and air spraying may be controlled to be alternately performed repeatedly. The liquid controller 120 may repeat the washer fluid spraying operation at regular periodic intervals, and the air controller 140 may also repeat the air spraying operation at regular periodic intervals. For example, the liquid controller 120 and the air controller 140 may repeat an on signal for the spraying operation at regular intervals. During an on signal period, washer fluid spraying or air spraying may be performed, and during an off signal period, a washer fluid or air spraying operation may not be performed. When the washer fluid spraying operation timing point and the air spraying operation time point are different from each other, the cycles of the two operations are the same, and the on signal period for washer fluid spraying and the on signal period for air spraying do not overlap each other, the washer spraying operation and the air spraying operation may not overlap each other and alternate with each other.

Figure 8:
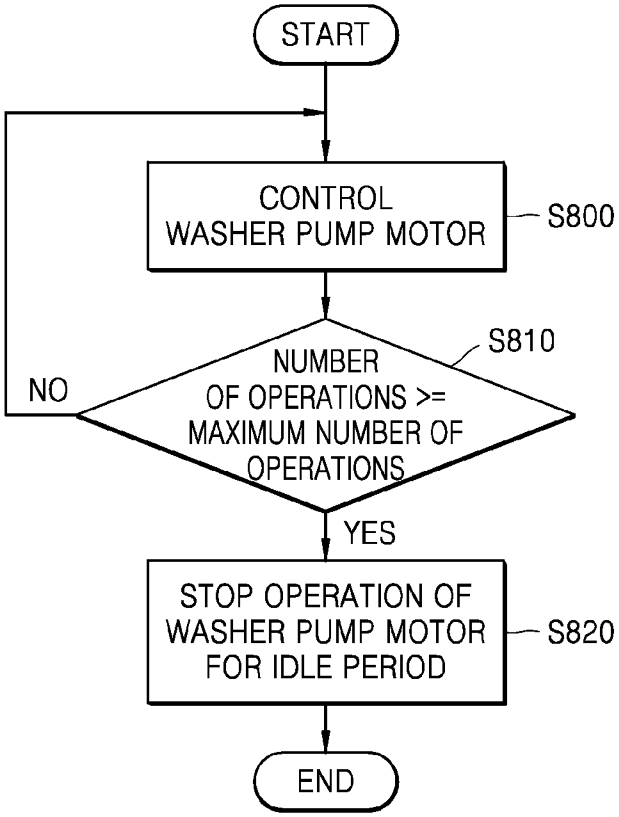
FIG. 8 is a view illustrating an example of a method of protecting a motor of a vehicle sensor cleaning apparatus, according to an embodiment.

FIG. 8 is a view illustrating an example of a method of protecting a motor of a vehicle sensor cleaning apparatus, according to an embodiment.

Referring to FIG. 8, the liquid controller 120 may control a washer pump motor that sprays washer fluid to at least one sensor located in a vehicle (S800). When the sensor is highly contaminated, the number of sprayings of washer fluid may increase, and the fatigue of the washer pump motor also may increase accordingly. In order to prevent overheating or damage to the washer pump motor during continuous spray operation of the washer pump motor, it is necessary to determine the internal temperature of the washer pump motor. However, there is the inconvenience of having to install a separate temperature sensor in a washer pump to determine the internal temperature. Accordingly, the present embodiment presents a method of preventing overheating or damage to the washer pump motor without a separate temperature sensor.

The liquid controller 120 may control the washer pump motor based on the number of operations of the washer pump motor rather than a temperature sensor. More specifically, when the number of operations of the washer pump motor reaches a predefined maximum number of operations (S810), the liquid controller 120 may stop the operation of the washer pump motor for a predefined idle period (S820). As an example, the time period for calculating the maximum number of operations may be a predefined past time period (e.g., from 5 minutes ago to the current time) based on the current time. As another example, the maximum number of operations may be newly counted at predefined intervals (e.g., every 5 minutes). For example, the number of operations may be newly counted every hour. In addition, the time period for calculating the maximum number of operations may vary depending on embodiments and is not limited to a specific example.

When the idle period elapses, the liquid controller 120 may switch the state of the washer pump motor to a reusable state. In other words, the number of operations of the washer pump motor may be initialized to 0. In another embodiment, when there are a plurality of washer pump motors and one of them is in an idle state, the liquid controller 120 may drive another washer pump motor that is not in an idle state.

Figure 9:
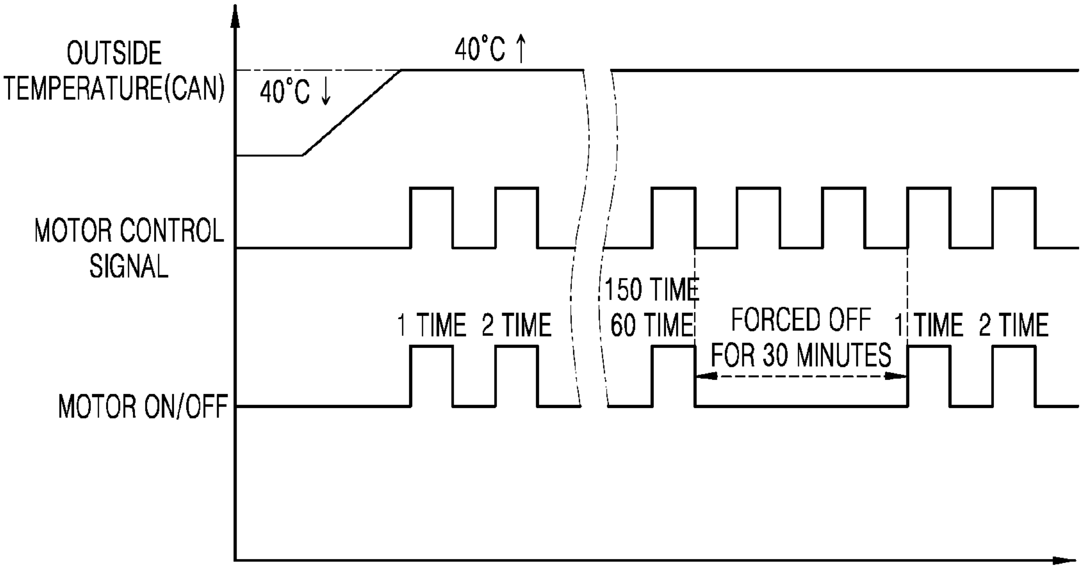
FIG. 9 is a view illustrating another example of a method of protecting a motor of a vehicle sensor cleaning apparatus, according to an embodiment.

FIG. 9 is a view illustrating another example of a method of protecting a motor of a vehicle sensor cleaning apparatus, according to an embodiment.

Referring to FIG. 9, the liquid controller 120 may output a control signal (i.e., a motor control signal) for controlling the on/off of a washer pump motor. The control signal for controlling the washer pump motor may be a pulse width modulation (PWM) control signal. The number of times the washer pump motor is driven may be counted as the number of on periods of the control signal.

In an embodiment, the liquid controller 120 may adjust the spraying intensity of washer fluid by controlling the intensity of the washer pump motor according to the width (i.e., duty cycle) of the on period of the control signal. In this case, the liquid controller 120 may count the number of operations by dividing the length of the on period of the control signal by a predefined reference length. For example, when the reference length is defined as 1 second and the length of the on period of the control signal is 2 seconds, the liquid controller 120 may calculate the number of operations as 2 times (=the length (2 seconds) of the on period/the reference length (1 second)) even though there is one cycle of control signal output. As another example, when the length of the on period of the control signal is 0.5 seconds, the liquid controller 120 may calculate the number of operations as 0.5 times (=0.5 seconds/1 second). Through this, it is possible to calculate the exact number of operations according to the load actually applied to the washer pump motor, according to the length of the on period of the control signal.

In another embodiment, the liquid controller 120 may set the maximum number of operations of the washer pump motor differently depending on the outside temperature. The liquid controller 120 may define a plurality of outside temperature sections and set the maximum number of operations for each outside temperature section. For example, when the outside temperature is less than 40 degrees, the maximum number of operations may be defined as 60 times, and when the outside temperature is equal to or greater than 40 degrees, the maximum number of operations may be defined as 150 times.

When the number of operations of the washer pump motor reaches the maximum number of operations, the liquid controller 120 may stop driving the motor for a predefined idle period (e.g., 30 minutes). For example, the liquid controller 120 may drive the washer pump motor by outputting a motor control signal for sensor cleaning to the washer pump motor. When the number of operations of the washer pump motor reaches the maximum number of operations, the liquid controller 120 may stop the operation of the washer pump motor for a predefined idle period. When the idle period elapses, the liquid controller 120 may input a motor control signal to the washer pump motor to restart the washer pump motor. In another embodiment, when there are a plurality of motors (i.e., a first washer pump motor and a second washer pump motor) that drive the washer pump, the liquid controller 120 may drive the second washer pump motor by outputting a motor control signal to the second washer pump motor when the first washer pump motor is in an idle state. When the second washer pump motor is in an idle state, the liquid controller 120 may determine whether the first washer pump motor is not in an idle state and drive the first washer pump motor.

In another embodiment, the method of controlling a washer pump motor, according to the present embodiment, may be applied to a compressor motor control method. That is, the air controller 140 may control the operation of a compressor motor based on the maximum number of operations in the present embodiment.

Figure 10:
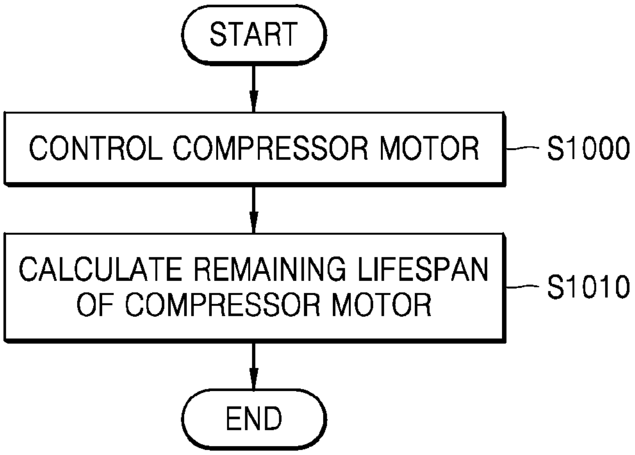
FIG. 10 is a view illustrating an example of a compressor motor control method according to an embodiment.

FIG. 10 is a view illustrating an example of a compressor motor control method according to an embodiment.

Referring to FIG. 10, the air controller 140 may control at least one compressor motor that compresses air to spray air to at least one sensor located in a vehicle (S1000). In an embodiment, when there are a plurality of compressor motors, the air controller 140 may operate the plurality of compressor motors alternately. In another embodiment, the air controller 140 may rapidly perform air filling by simultaneously operating a plurality of compressor motors.

The air controller 140 may determine the remaining lifespan of the compressor motor based on a lifespan calculation formula defined based on at least one of the number of operations, an operation duration, a charging pressure, and a temperature (outside temperature, etc.) of the compressor motor (S1010). As the number of operations, operation duration, charging pressure, and temperature of the compressor motor increase, the lifespan of the compressor motor decreases. The lifespan calculation formula may be defined in advance by determining the weight of each factor affecting lifespan through several experiments. The present embodiment assumes that the lifespan calculation formula is predefined.

Figure 11:
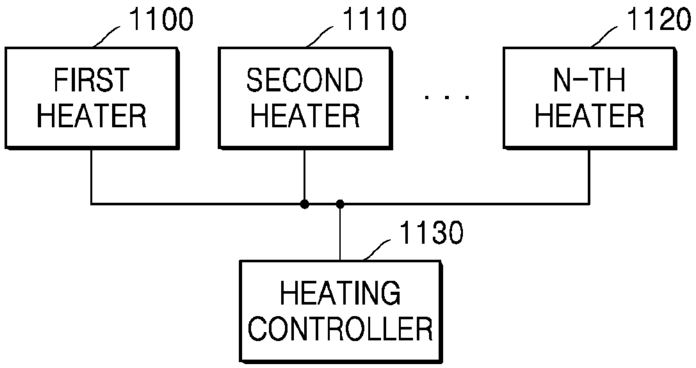
FIG. 11 is a view illustrating an example of a heating control method according to an embodiment.

FIG. 11 is a view illustrating an example of a heating control method according to an embodiment.

Referring to FIG. 11, a heating controller 1130 may control a plurality of heaters 1100, 1110, and 1120. The plurality of heaters 1100, 1110, and 1120 may provide heat to prevent freezing of a washer fluid sprayer and/or an air sprayer that sprays washer fluid and/or air to at least one sensor located in a vehicle. For example, the plurality of heaters 1100, 1110, and 1120 may be arranged to supply heat to various places, such as a washer fluid tank, hose, and nozzle.

In an embodiment, when the outside temperature is equal to or less than a predefined temperature (e.g., when the outside temperature is equal to or less than 0 degrees for more than 1 second), the heating controller 1130 may provide heat to the washer fluid sprayer and/or the air sprayer through the plurality of heaters 1100, 1110, and 1120. The heating controller 1130 may receive outside temperature information from the vehicle or determine the outside temperature through its own temperature sensor.

When the plurality of heaters 1100, 1110, and 1120 simultaneously operate, excessive inrush current may occur. A method of preventing the excessive inrush current will be described with reference to FIG. 12. The heaters 1100, 1110, and 1120 that provide heat in sub-zero temperatures may be controlled by an on/off method and then a duty control method to quickly thaw each component of the vehicle sensor cleaning apparatus. This will be described with reference to FIG. 13. Various other heating control methods will be described below.

Figure 12:
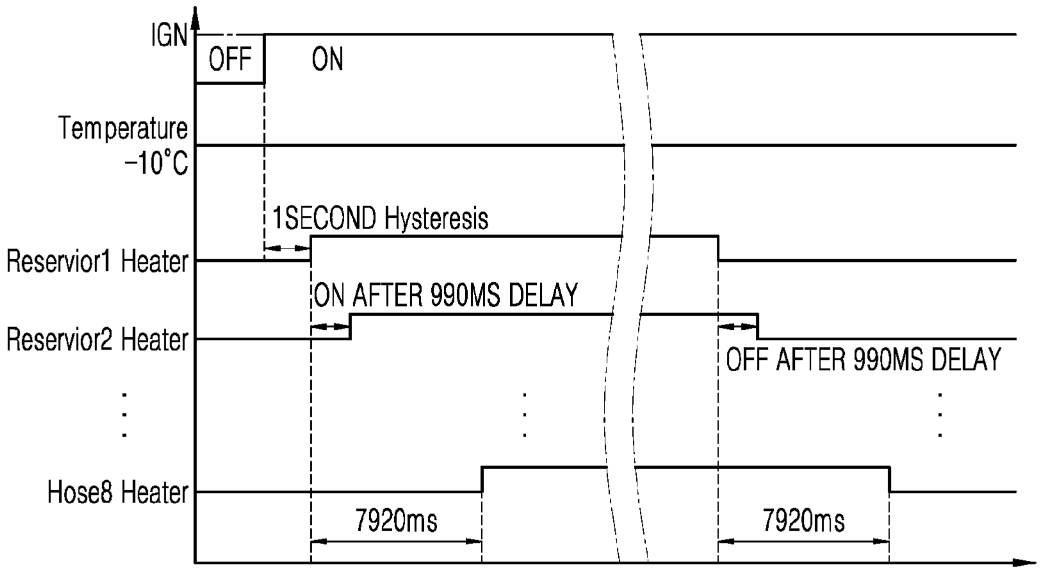
FIG. 12 is a view illustrating an example of a method of preventing an excessive inrush current in a heating control method according to an embodiment.

FIG. 12 is a view illustrating an example of a method of preventing excessive inrush current in a heating control method according to an embodiment.

Referring to FIG. 12, the heating controller 1130 may sequentially drive the plurality of heaters 1100, 1110, and 1120 at regular intervals in order to prevent excessive inrush current that occurs when the plurality of heaters 1100, 1110, and 1120 are simultaneously driven after an ignition signal IGN is turned on (i.e., the vehicle engine starts). For example, in order to control 11 heaters that supply heat to 3 washer fluid tanks (i.e., washer fluid reservoirs) and 8 hoses, when the ignition signal IGN is turned on (i.e., the vehicle power is turned on), the heating controller 1130 may output a second heating control signal for driving a second heater when a certain period of time (e.g., 990 ms) has elapsed after outputting a first heating control signal for driving a first heater. In this way, the heating controller 1130 may sequentially generate heating control signals for driving a plurality of heaters.

Figure 13:
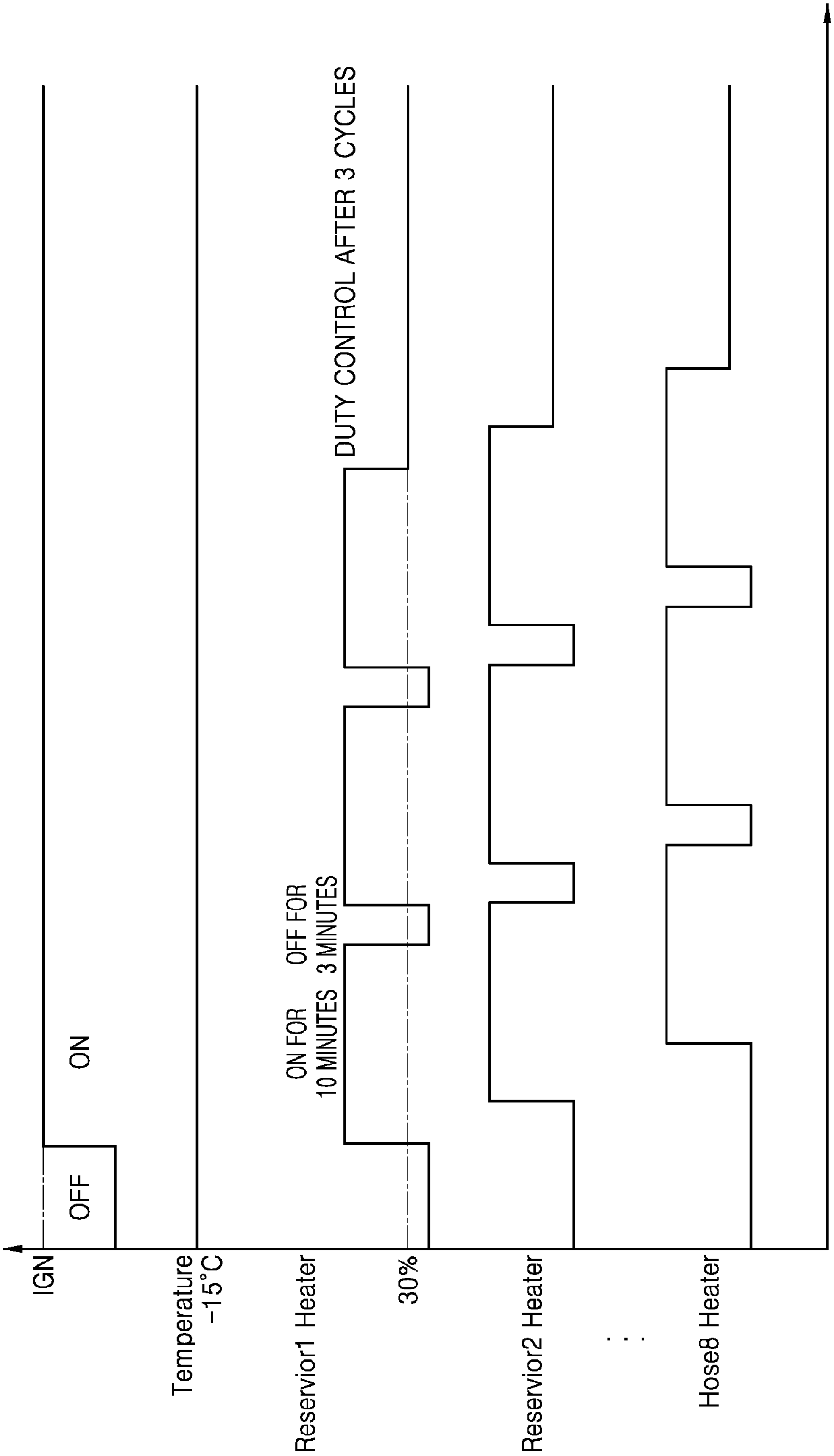
FIGS. 13 and 14 are views illustrating an example of an on/off heating control method according to an embodiment.
Figure 14:
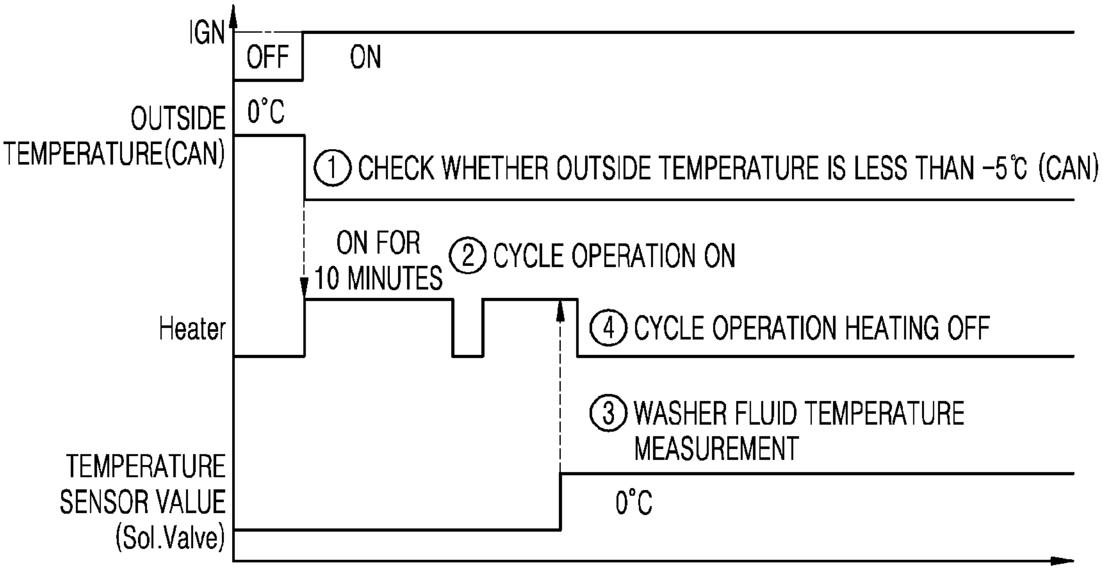

FIGS. 13 and 14 are views illustrating an example of an on/off heating control method according to an embodiment.

Referring to FIG. 13, when the outside temperature is equal to or less than a preset temperature (e.g., when the outside temperature is equal to or less than −5 degrees for more than 1 second), the heating controller 1130 may supply heat for a certain period of time (e.g., 10 minutes) and stop supplying heat for a certain period of time (e.g., 3 minutes), and then may control the heaters 1100, 1110, and 1120 to repeat the process of supplying and stopping heat again for a certain period of time for a certain number of times (e.g., 3 times). The heating controller 1130 may perform duty control after controlling the heat supply on/off for a predefined time period. An example of a duty control method will be described with reference to FIG. 15.

Referring to FIG. 14, the heating controller 1130 may stop the heating control process when the washer fluid temperature is equal to or greater than a certain temperature (e.g., 0 degrees) in the process of repeating the process of supplying and stopping heat for a certain period of time through control of the heaters 1100, 1110, and 1120. The washer fluid temperature (e.g., the washer fluid temperature in the washer fluid tank, the washer fluid temperature in the hose, or the temperature of the nozzle valve) may be determined through a separate temperature sensor. The process of FIG. 14 may be applied to each heater.

For example, the heating controller 1130 may determine in real time whether the outside temperature is less than −5 degrees (①). When the outside temperature is less than −5 degrees, the heating controller 1130 may repeat the process of supplying heat for 10 minutes through the heaters 1100, 1110, and 1120 and stopping the heat supply for 3 minutes (②). The heating controller 1130 may determine the temperature of the washer fluid in real time (③), and when the temperature of the washer fluid is equal to greater than a predefined temperature (e.g., 0 degrees), the heating controller 1130 may stop supplying heat to a corresponding heater (④).

Figure 15:
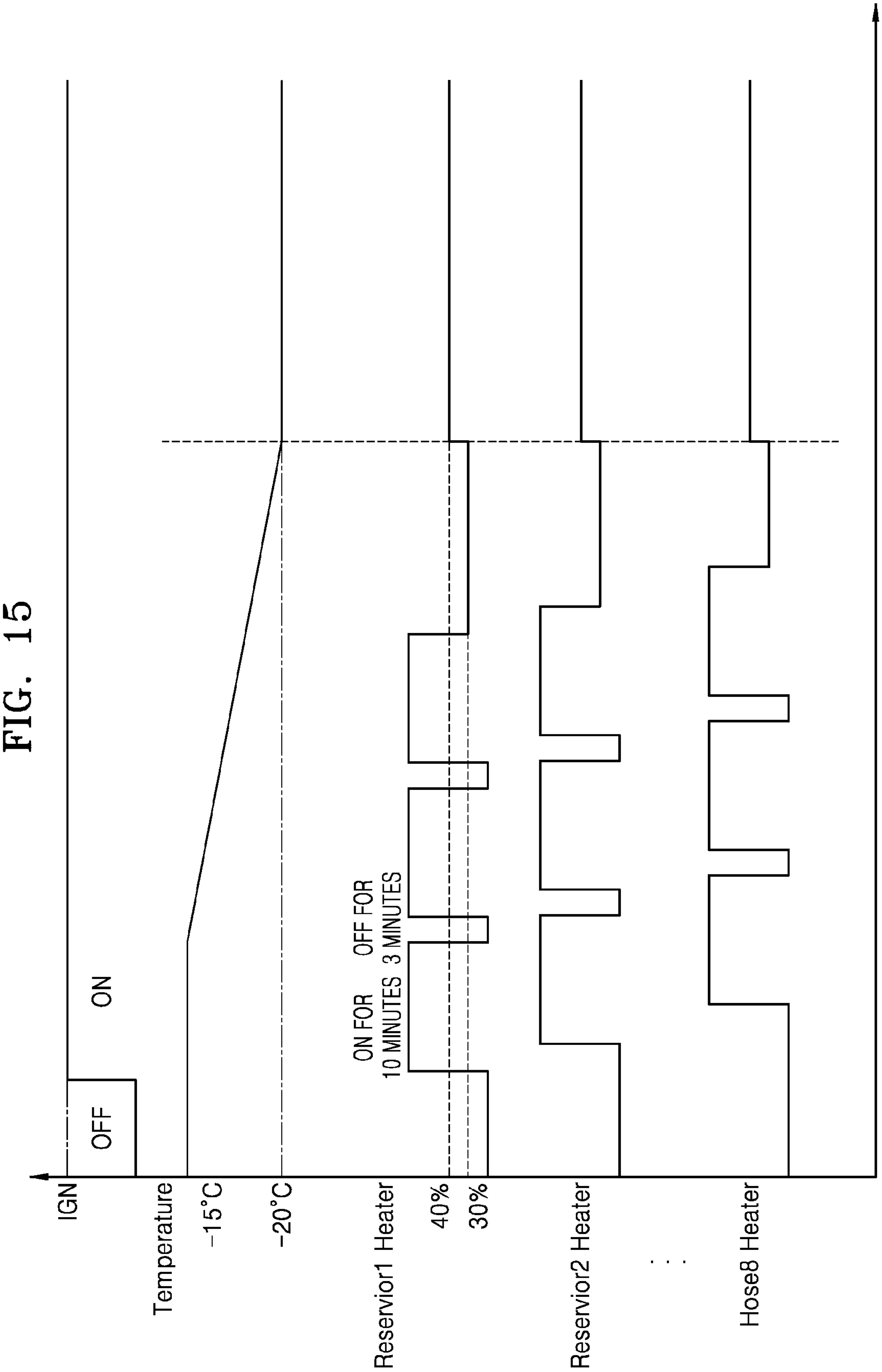
FIG. 15 is a view illustrating an example of a duty control method in a heating control method according to an embodiment.

FIG. 15 is a view illustrating an example of a duty control method in a heating control method according to an embodiment.

Referring to FIG. 15, the heating controller 1130 may dynamically adjust the duty cycle of a heating control signal according to the outside temperature. The heating controller 1130 may control the heaters 1100, 1110, and 1120 so that more heat is supplied to the washer fluid tank, hose, etc. by increasing the duty cycle of the heating control signal as the outside temperature decreases. The heating controller 1130 may divide the outside temperature into a plurality of sections (e.g., a plurality of temperature sections below 0 degrees) and predefine the duty cycle of the heating control signal for each temperature section.

In an embodiment, the heating controller 1130 may drive at least one heater 1100, 1110, and 1120 when the outside temperature is equal to or less than 0 degrees to supply heat to the washer fluid tank, hose, etc. In this case, when the outside temperature is equal to or less than a predefined temperature (e.g., −5 degrees), the heating controller 1130 may control the heaters 1100, 1110, and 1120 by performing a certain number of cycles of supplying heat and stopping heat supply by using the method shown in FIGS. 13 and 14 and then outputting a heating control signal having a certain duty cycle. For example, when the outside temperature is −10 degrees or less, the heating controller 1130 may output a heating control signal having a duty cycle of 20%, and when the outside temperature is −15 degrees or less, the heating controller 1130 may output a heating control signal having a duty cycle of 30%. In addition, when the outside temperature is −20 degrees or less, the heating controller 1130 may output a heating control signal having a duty cycle of 40%. The duty cycle of the heating control signal according to the outside temperature may vary depending on embodiments and is not limited to the present embodiment.

Figure 16:
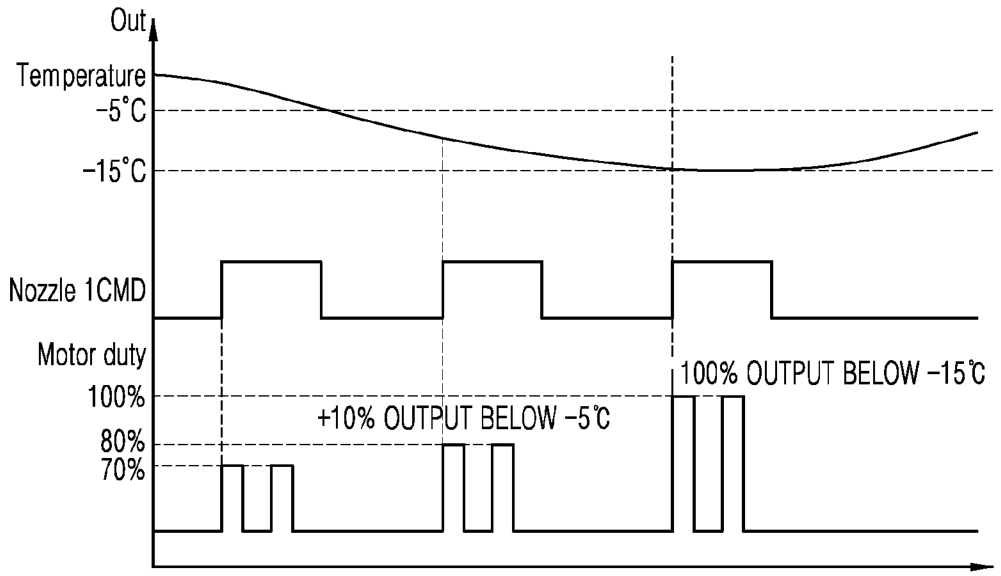
FIG. 16 is a view illustrating an example of a motor duty compensation method for maintaining cleaning performance at low temperatures, according to an embodiment.

FIG. 16 is a view illustrating an example of a motor duty compensation method for maintaining cleaning performance at low temperatures, according to an embodiment.

Figure 17:
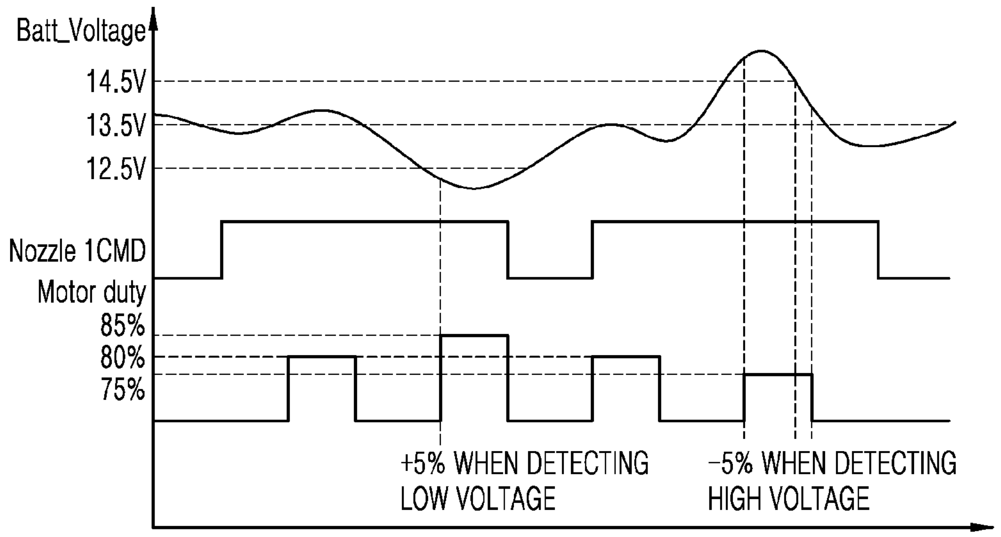
FIG. 17 is a view illustrating an example of a control method for maintaining cleaning performance in battery voltage fluctuations, according to an embodiment.

Referring to FIG. 16, the liquid controller 120 may dynamically control the driving time of a washer pump motor in sub-zero outside temperature. As an example, the liquid controller 120 may dynamically adjust the duty cycle of a washer fluid control signal according to the sub-zero outside temperature. The washer fluid control signal may be a PWM control signal, and the driving time of the washer pump motor may be controlled according to the duty cycle. For example, the liquid controller 120 may increase the duty cycle as the outside temperature decreases. In FIGS. 16 and 17, 'Nozzle 1CMD' represents a control signal for turning on the nozzle of a sensor to be cleaned.

In an embodiment, the liquid controller 120 may define a compensation value for the duty cycle according to the section of the outside temperature. For example, when the outside temperature is −5 degrees or less, the liquid controller 120 may increase the duty cycle of the washer fluid control signal by 10%, and when the outside temperature is −10 degrees or less, the liquid controller 120 may increase the duty cycle of the washer fluid control signal by 15%. In addition, when the outside temperature is −20 degrees or less, the liquid controller 120 may output the duty cycle of the washer fluid control signal as 100%. The duty ratio compensation value of the washer fluid control signal according to the outside temperature may vary depending on embodiments and is not limited to the present embodiment.

FIG. 17 is a view illustrating an example of a control method for maintaining cleaning performance in battery voltage fluctuations, according to an embodiment.

Referring to FIG. 17, the liquid controller 120 and/or the air controller 140 may dynamically adjust the duty cycle of the washer fluid control signal and/or the duty cycle of the air control signal, according to a supply voltage. In an embodiment, the liquid controller 120 and/or the air controller 140 may adjust the duty cycle of the washer fluid control signal and/or the duty cycle of the air control signal based on the difference between the supply voltage and a predefined reference voltage (e.g., 13.5V). When the supply voltage is lower than the reference voltage, the liquid controller 120 and/or the air controller 140 may increase the duty cycle of the washer fluid control signal and/or the duty cycle of the air control signal, and when the supply voltage is higher than the reference voltage, the liquid controller 120 and/or the air controller 140 may reduce the duty ratio of the washer fluid control signal and/or the duty cycle of the air control signal.

The disclosure may also be implemented as a computer-readable program code on a computer-readable record medium. The computer-readable recording medium may include every type of recording device storing data readable by a computer system. Examples of the computer-readable recording media may include ROM, RAM, CD-ROM, magnetic tapes, floppy disks, optical data storage devices, etc. In addition, the computer-readable recording media may be distributed to a computer system connected by a network such that a computer-readable code may be stored and executed in a distributed method.

According to an embodiment, foreign materials on the surface of a sensor included in a vehicle may be cleanly removed by spraying washer fluid. Additionally, overheating or damage to a washer pump motor that sprays washer fluid may be prevented. In another embodiment, overheating of a compressor motor that compresses air may be prevented and the lifespan thereof may be extended. In another embodiment, convenience of maintenance may be provided by predicting the replacement cycle and lifespan of a compressor motor. In another embodiment, a heater may prevent washer fluid, etc. from freezing in winter.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A vehicle sensor cleaning apparatus comprising:

a washer pump motor configured to spray a washer fluid on at least one sensor located in a vehicle; and a liquid controller implemented as a micro controller unit (MCU) configured to output control signals of pulse width modulation (PWM) to the washer pump motor, wherein the liquid controller is configured to adjust a duty cycle of each control signal according to an outside temperature, and output each control signal with a duty cycle corresponding to the outside temperature, wherein the liquid controller is further configured to, for each control signal for driving the washer pump motor, count a number of operations of the washer pump motor by dividing a length of an on period of each control signal by a predefined reference length, such that, when the on-period of each control signal exceeds the predefined reference length, each control signal is counted as multiple operations, and wherein the liquid controller is further configured to stop the washer pump motor from operating for a predefined idle time when the number of operations counted for a predefined interval reaches a predefined maximum number of operations.

2. The vehicle sensor cleaning apparatus of claim 1, wherein the maximum number of operations is preset differently according to the outside temperature.

3. The vehicle sensor cleaning apparatus of claim 1, further comprising:

at least one compressor motor configured to compress air to spray air on the at least one sensor located in the vehicle; and an air controller configured to control the at least one compressor motor.

4. The vehicle sensor cleaning apparatus of claim 3, wherein washer fluid spraying and air spraying are alternately performed.

5. The vehicle sensor cleaning apparatus of claim 3, wherein the air controller is further configured to alternately operate a plurality of compressor motors.

6. The vehicle sensor cleaning apparatus of claim 3, wherein the air controller is further configured to rapidly perform air filling by simultaneously operating a plurality of compressor motors.

7. The vehicle sensor cleaning apparatus of claim 1, further comprising:

a plurality of heaters configured to provide heat to prevent freezing of a washer fluid sprayer and/or air sprayer that sprays washer fluid and/or air on the at least one sensor located in the vehicle; and a heating controller configured to control the plurality of heaters.

8. The vehicle sensor cleaning apparatus of claim 7, wherein the heating controller is further configured to output control signals to the plurality of heaters at predefined intervals in order to prevent an excessive inrush current.

9. The vehicle sensor cleaning apparatus of claim 8, wherein the heating controller is further configured to repeatedly output a control signal including a predefined on period and off period to each of the plurality of heaters a certain number of times.

10. The vehicle sensor cleaning apparatus of claim 1, wherein the liquid controller is further configured to dynamically adjust a duty cycle of the each control signal for controlling the washer pump motor according to a supply voltage, and output the control signal having the adjusted duty cycle.

* * * * *